United States Patent
Goodman

[11] Patent Number: 6,056,874
[45] Date of Patent: May 2, 2000

[54] PIERCING FILTER OIL CONTAINMENT BOOT

[76] Inventor: Lowell R. Goodman, 793 Swan Lake Ave., Belfast, Me. 04915

[21] Appl. No.: 09/066,731

[22] Filed: Apr. 25, 1998

[51] Int. Cl.[7] .............................. F01M 11/04; F16N 31/00
[52] U.S. Cl. .......................... 210/248; 184/106; 137/312; 141/330
[58] Field of Search ............................... 210/94, 168, 232, 210/238, 233, 248, 416.5, DIG. 17; 184/1.5, 106; 141/85, 86, 115, 330; 137/312, 315; 222/108, 111; 123/196 A; 220/571.1, 573

[56] References Cited

U.S. PATENT DOCUMENTS

| | | |
|---|---|---|
| 4,266,452 | 5/1981 | Crist . |
| 4,695,088 | 9/1987 | Jensen . |
| 5,169,541 | 12/1992 | Wells . |
| 5,271,299 | 12/1993 | Wadsworth . |
| 5,390,823 | 2/1995 | Kilgore . |
| 5,598,951 | 2/1997 | DeBano, Jr. . |
| 5,623,755 | 4/1997 | Childress et al. . |
| 5,694,990 | 12/1997 | Crima . |
| 5,782,276 | 7/1998 | Kilgore . |
| 5,871,476 | 2/1999 | Hand . |

*Primary Examiner*—David A. Simmons
*Assistant Examiner*—Fred Prince
*Attorney, Agent, or Firm*—Stan Jones

[57] ABSTRACT

Spillable oil from an oil filter and adjacent engine cavities of trapped engine oil is transferred outwardly through filter housing sidewalls at designated low points to a temporary boot container by gravity following a piercing operation through the filter housing. Oil transfer to the container is performed prior to breaking the seal between the engine block and the filter. All of the spillable oil is caught in the boot containment device which incorporates internal tack like hollow piercing elements. The required piercing force to drive the tacks into the filter wall may be applied to the exterior of the filter boot using common filter strap wrenches, or by light taps from a hammer, wrench or similar tool.

21 Claims, 5 Drawing Sheets

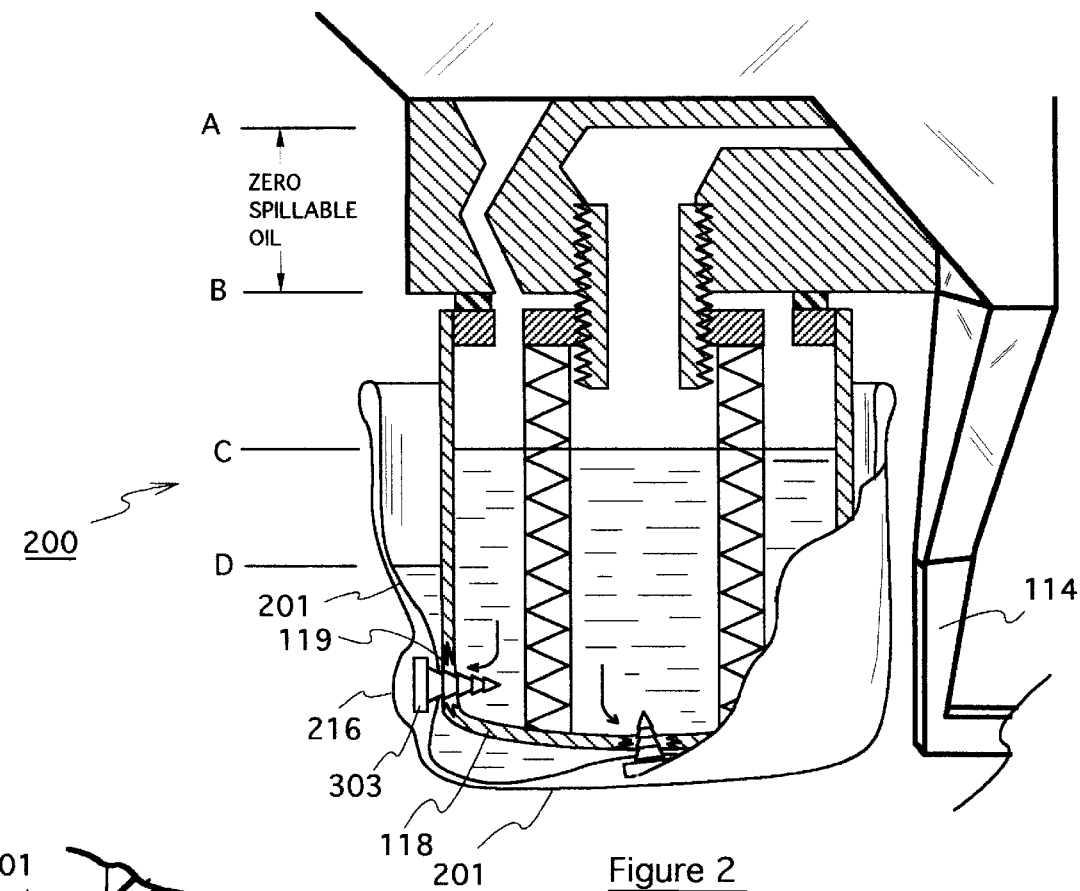
Figure 2
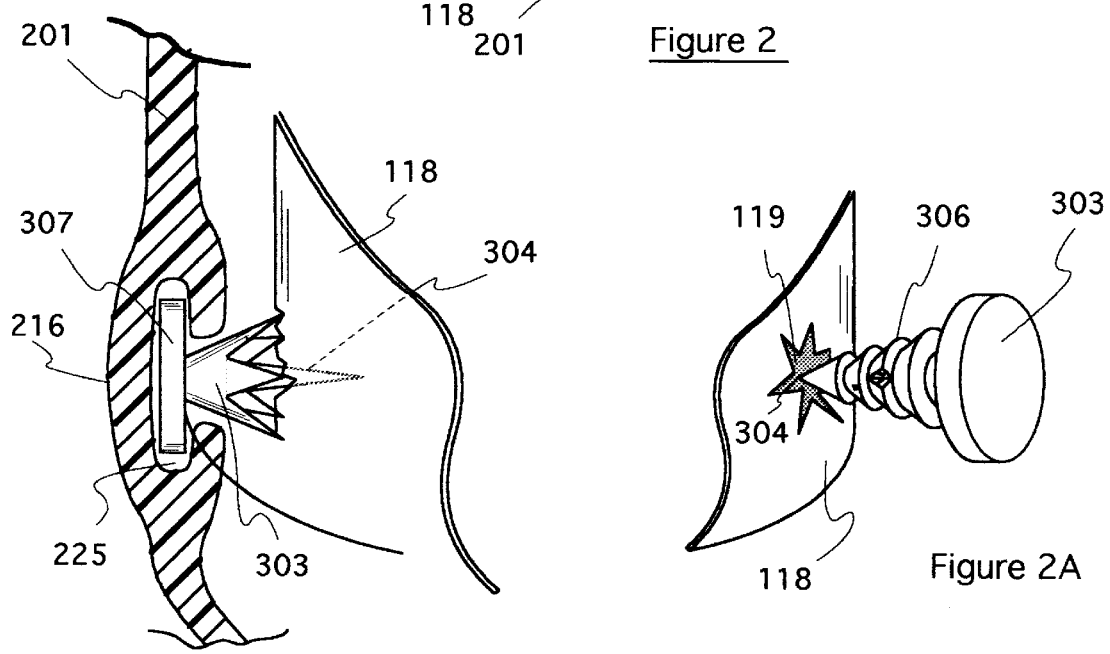
Figure 2B
Figure 2A

PIERCING FILTER OIL CONTAINMENT BOOT

BACKGROUND OF THE INVENTION

1. Field of the Invention

The invention relates to the field of engine oil filters, and more specifically to a method and apparatus for capturing and containing spillable oil during an oil filter removal operation.

Further, the invention relates to a filter housing piercing and integrated oil containment apparatus.

More particularly, this invention relates to a device which is hand attachable with one or more internal piercing elements which create liquid release from within a filter housing thereby transferring the spillable oil through a punctured filter wall to a spill proof temporary boot or container. This oil transfer occurs prior to a final breaking of the seal between the engine and the filter.

2. Background of the Invention

Prior to 1955, filtering of automotive engine oil was accomplished by routing the oil through a series of hoses or pipes and then through a porous (usually paper) element or cartridge contained in a separate cylindrical canister. In 1955, Wix Corporation introduced the one piece "spin-on" disposable oil filter assembly. This easily removable filter apparatus revolutionized the automotive oil filter industry, and soon became standard equipment on virtually every car and light truck. The filter and engine designs quickly became complementary, and, as a result, the spin-on filter has remained in its basic configuration since it's inception.

This original spin-on design became ensconced long before oil was classified as a hazardous waste. It includes a thin-wall continuous outer container to house and surround the paper or porous filter cartridge. A spin-on assembly is mounted on the engine block and is held in place by compression against a deformable gasket.

One popular type of spin-on filter incorporates a female thread within the filter which mates (usually upward) with a male threaded pipe, tube, or insert. This mate threaded tube remains integral with the engine block. Such mating threads during installation squeezed a flat-face O-ring type rubber gasket between the face of the filter housing and a corresponding engine block boss ("flat").

This design, though efficient for physical removal and reinstallation, created a "standpipe" above the filter which was always full of additional captured (or pooled) oil when the engine is at rest. This nominal ¼ cup of oil for millions and millions of oil changes, must by gravity, always spill once the seal is broken. This spill has occurred continuing at the ¼ to ½ cup level for every oil change since the invention of the spin-on filter. During each oil change, a portion of spilled oil also inevitably tracks down as an oil coating over the engine block where it is subsequently washed off along our roadways.

Spillage of oil during filter removal has been considered by most mechanics to be an unsolvable problem. Attempts at a solution have been to place a large catch pan under the engine. Such catch pans are not satisfactory and inevitably spills takes place. An artisan faced with an oil filter removal, seemingly resigned to his fate, simply takes extra rags and faces the splash and oil drippings as an unchangeable fact of life around engine repair and maintenance centers.

Confounding the problem further, it should be noted that over the last two decades, mileage and emissions priorities have been at the forefront. The associated rules and regulations have greatly multiplied the emission devices and thus have caused automobile and marine manufactures to unduly crowd the designs of engine compartments. As such, the accessibility of the spin-on oil filter has become more and more limited, and hence much more prone to spillage during removal. The mechanic simply does not have room to work during the filter removal/replacement task.

These difficulties of access and environmental hazards are compounded at least a hundred fold in the marine field.

The above stated design issues, coupled with the increased understanding, and awareness of oil as a hazardous material, makes the need for a clean spill proof method and apparatus for oil filter removal, an issue of major importance. Prior to the advent of this invention, a spill proof oil filter removal method and apparatus simply did not exist. This invention for the first time solves a long standing recognized problem that heretofore remained unsolved and thus meets the test of an invention of major importance.

EXPLANATION OF TERMS

Certain terms are used to introduce and explain the background of the art and the invention; and, for convenience and completeness sake, such terms are summarized in this section. These terms are not meant to supersede the claims nor the definition of terms as defined within the four corners of the specification; but, rather, are meant to further the understanding of the invention and briefly introduce the technical art stage for a detailed teaching of the improvement in the art as provided by this invention.

Spin-On Oil Filter.

A self contained, removable, disposable filter and associated metal housing apparatus with centrally located female threads for sealable mating with an automotive engine. Such a filter provides a series filtering exposure to engine oil which is forcibly circulated through a filter cartridge for cleaning purposes.

Cartridge Oil Filter.

A older style cylindrical paper element housed in an outer steel container, with the container permanently plumbed to the engine with oil circulation hoses. Usually such an element is suspended longitudinally within the housing, with the suspended position allowing the oil to filter through the element from inside to out or vice versa.

Filter Gasket.

A top, circumferential rubber seal which maintains the filter to engine pressure and provides a tight connection for a spin-on filter to an engine block by the spin-on action of the filter itself.

Filter Wrench.

Any number of clamping or squeezing devices with handles which attempt to grasp the spin-on filter by friction. such devices either surround the cylindrical wall or attach to the filter bottom for tightening and loosening the filter from the engine block.

Engine Block Filter Sealing Boss.

A machined flat surface on the engine block for sealably mating the spin-on oil filter to the engine.

Mounting Nipple (Male).

A threaded centrally located stub which is permanently fixed to the engine. It receives the spin-on female filter. It is hollow and acts as one conduit for oil passage to the filter.

Return Port.

Entrance holes within the top periphery of the metal filter housing through which the oil enters the filter under pressure created by the engine oil pump.

Pressure Port(s).

The central orifice of the filter through which the oil passes on its return to the engine after having passed through the porous filtering element.

Filter Housing.

The external sheet metal casing (Approx. 0.050 in thickness). Such housings are always cylindrical on the order of 2 to 6 inches in diameter, and may vary in height according to the required filtering capacities; most housings usually have a height of about 3 to 10 inches. Commercial trucks and large diesel engines are proportionally larger and may be as large as 10 to 14 inches in height. The filter industry tends to keep diameters relatively constant for a given family of engine applications, although lengths may vary for a given diameter.

Spillable Oil.

The volume of oil which may be mishandled during removal of an oil filter. Spillable oil for purposes of this invention is defined as excess oil (over and above the volume of a full filter) which is trapped in the engine block circulation cavities above the top level of the spin-on filter.

Orientation.

The angle which a longitudinal axis through the oil filter is tilted away from the vertical. A vertical orientation is defined as transverse to the female mounting threads at the top of the filter casing.

Piercing Element.

One or more sharp metal pointed tack like objects or needle like tubes imbedded within an oil containment boot. Such metallic, or hard synthetic sharp pointed elements, by using leveraged inward forces minimally greater than hand or thumb pressure, are capable of puncturing the bottom and/or side walls of typical spin-on filter housings.

DESCRIPTION OF PRIOR ART

The average automotive spin-on filter requires approximately 15 complete revolutions for removal. In this spinoff process, a corresponding and ever increasing gap is created between the filter seal and the its engine block seating surface. This gap is on the order of ½ inch or greater at the maximum extent of the spinoff process, prior to final release from the mounting nipple.

The prior art for oil filter removal and various attempts at spill capture is developed by several references. A search for this invention has disclosed a number of related references, several of which have some marginal relevance to this invention. Each of those prior art references will now be discussed.

U.S. Pat. No. 5,469,935 (Hewuse, 1995). Hewuse attempts to capture the oil spill in a cup by relying upon a working seal between the apparatus and the engine block. Peripherally, the device incorporates a bottom end filter wrench within the apparatus. The Hewuse device, like others in the prior art, simply does not recognize the standpipe and associated engine cavities portion of the spillable oil problem. The Hewuse device is very filter height or length critical and does not demonstrate any accommodation for 15 revolutions of spin-off and the associated ½ inch spacing which occurs when the several revolutions of the filter occur during removal. Hewuse does not teach or disclose piercing or oil transfer through piercing points in the housing.

U.S. Pat. No. 5,121,776 (Kovach, 1992). Kovach is also only peripherally related in that the purpose of this disclosure is to service the engine oil itself through a bag which uses a glove for releasing the drain plug. The Kovach device, given the associated space constraints, and mechanical operations required, is simply not applicable to oil filter removal.

U.S. Pat. No. 3,043,171 (A. H. Lederer, 1960). Lederer is only peripherally related in that the objective of his disclosed device is to provide a leverage tool for applying increased rotational torque to a filter which has been seized to an engine block. Such seizing is usually the result of improper filter installation such as cross or improper threading. Hence, his device only addresses an anomalous mechanical situation of a non-removable spin off filter, not the millions and millions of routine filter changes wherein the spin-on filter has not been cross threaded.

U.S. Pat. No. 5,154,102 (Becker, 1992). Becker addresses the same field problem as Lederer. It is otherwise not applicable.

U.S. Pat. No. 4,451,368 (Pandelena et al., 1984). Pandelena et al discloses a funnel shaped flexible slip on device required to fit tightly enough to seal oil against the exterior of the filter housing. While the embodiment shown in the Pandelena FIG. 1 might catch a portion of the spillable oil, its potential is greatly diminished with 30 and 45 degree filter mountings, and its capability would be almost totally useless for horizontally mounted filters.

Pandelena et al presents other embodiments in FIGS. 8 and 9 which use an annular cap 44 which snap fits to main body 30. This two part, thin walled device must then seal against engine block 51 and remain sealed during the spin off operation. By comparison, my invention does not require a seal to the engine block at any time during the operation; and further, the spillable oil is removed through the filter housing prior to breaking the gasket-to-filter engine block seal.

U.S. Pat. No. 4,376,703 (Krauss, 1983). The Krauss apparatus presents many similarities to the Pandelena et al device. Krauss's shortcomings are also very similar in that his apparatus totally depends upon upper lip 20 of Krauss FIG. 2 maintaining a liquid holding seal against an engine block during the spin off process. In certain configurations, a device such as this may capture a portion of the spillable oil, but, will not perform the capture and containment functions of my invention nor does it suggest the principle I teach and claim herein.

In summary, the prior art discloses various attempts at handling and containing oil during the spin-off procedure. In all of the prior art, the approach taken appears to have unduly focussed on sealing against the engine block. Also it appears that the prior art attempted to catch both the spillable oil and the filter oil. None of such art discloses the spillable oil problem, but, instead, took the pan catching philosophy one step further without recognition of the real underlying problem or my solution.

The root of the problem is the spillable oil within the engine cavity as defined herein. Such oil is not coming from within the filter but rather hides within the engine cavity and suddenly cascades over the gasket as the block-to-filter seal is broken. Although such prior art may, to the unexperienced, appear to have merit, such is not the case. The prior art oil collectors are clearly not field practical.

Every mechanic would most likely agree that the devices of the art are only minimally effective at best. Having been bathed time and time again in failed attempts to change a filter cleanly, such artisans have simply resigned themselves to the fact of oil spillage and waste time and money attempting to clean up the mess caused in almost every oil filter change. Even the most careful mechanic will not be able to catch the spillable oil out of the cavity area.

The prior art cup type devices all purport to effect a "live" seal between the cup device and the engine block, and purport to maintain that seal during rotation. Any oil change technician (especially marine) knows that the engine compartment constraints—braces, brackets and the like—absolutely prevent practicality in that approach. Many marine and similar applications do not even allow the oil-change technician to see what he is doing much less catch the oil in a cup. Keeping a seal to the marine engine block in these cases is virtually impossible.

An even more perplexing problem for today is the fact that spilled oil clings to the engine block and ultimately contaminates our roadways and the underground water supply. Spillable oil tracks by surface tension and gravity along the engine block. None of the prior art can deal with this problem since their only method of capture is an attempted seal between a necessarily flimsy device and what is really a rough surface of an engine block. Even a careful and dedicated mechanic can't clean away all of the engine coatings from the spilled oil.

Therefore, my invention transfers and contains spillable oil from a cavity within an engine oil filter mounting area. It is a hand installable, flexible containment boot which works. Piercing elements within my containment boot solve a previously unsolved problem of long standing. Pierced holes in the filter canister are created specifically to allow oil from said engine mounting cavities and said mounted filter to transfer through a filter wall and into my containment boot invention.

SUMMARY OF THE INVENTION

The basis of the invention is the apparatus and method of transferring and containing spillable oil from an oil filter and adjacent pockets of trapped engine oil. The apparatus uniquely accomplishes the task by transferring the spillable oil outwardly through the filter wall at designated low points to a temporary container by gravity, following a piercing operation through the filter housing.

The waste oil transfer in accordance with my invention is performed, at rest, prior to breaking the seal between the engine block and the filter. My novel method thereby relocates and contains all of the spillable oil within a filter wall piercing boot containment device.

Piercing elements may be integral to, and/or embedded within the lower internal periphery of a sleeve or boot shaped container, and the required piercing force may be applied to the exterior of the filter boot using common filter strap wrenches, or by light taps from a hammer, wrench or similar tool. These piercing elements may be serrated or twisting, spiral tack like.

The containment boot is translucent, thereby providing a visual estimate of transferred, spillable oil, prior to breaking the oil filter seal. A major key to success is transferring the waste oil through the pierced housing, and thus lower the level of oil within the filter to a point below the lowest lip of the gasket. Filter orientation whether horizontal, vertical or angled mounting—is immaterial and all are safely handled with ease by my invention.

It is the purpose of the present invention to provide a device to aid in filter removal and make the filter removal process spill free. The device performs this function uniquely by combining a cup or boot with multiple, internally embedded split piercing elements or tubes or devices of sufficient rigidity to pierce the thin metal filter housing and provide gravity drainage through the filter housing into the catch sleeve or boot.

By providing an oil transfer positionally at a significantly lower point than the rubber filter seal, a unique filter removal methodology is provided. Traditional wrenches may be used to loosen the filter to hand tight, prior to the piercing process. Additionally, traditional band type wrenches may be used over the top of my novel device as an aid in loosening and achieving my piercing process.

OBJECTS OF THE INVENTION

In general, the invention is designed such that it can be formed as a one piece molded semi-rigid body with embedded piercing elements.

It is an object of the invention to capture spillable oil from an engine oil filter.

It is an object of the invention to provide hollow canister piercing points within, and, integral to an oil collection boot.

It is an object to secure the piercing means within an oil containment boot, and oriented substantially orthogonal to the boot and a filter canister housing.

It is an object to provide a bulbous structure to the bottom of the containment boot for additional volumetric oil containment during an oil filter change process.

It is an object of the invention to access the oil from within the filter and through the canister housing by employment of piercing points which puncture the filter wall.

It is an object to transfer spillable oil through hole(s) in the filter housing created by an internal piercing mechanism that is held by a containment boot.

It is an object to reduce the internal volume of oil in a filter prior to breaking the seal between the filter and the engine.

It is an object to provide gravity draining of the spillable oil from the filter internally prior to breaking the filter seal.

It is an object to configure piercing elements, such that, once deployed into the filter wall, they support the weight of the boot and allow oil to safely drain unattended into my boot.

It is an object to provide a clean oil filter removal technique thereby keeping hands and surrounding engine areas clean and free of oil spills.

It is an object to transfer and contain spillable oil such that a technician is protected from spilling hot engine oil.

It is an object to transfer an amount of oil through the filter housing into the container, without any attempt to seal the containment boot to the engine block.

It is an object to reduce the oil through the canister housing so as to avoid spillage over the gasket of the lip of the filter and, subsequently, the engine block during the removal process.

It is an object to make available a draining process and cup volume such that a substantial amount of spillable oil is transferred to the containment boot.

It is an object to effect a wide range of filter application coverage by accomplishing boot installation and usage with side clearances of about an ⅛ inch or less.

BRIEF DESCRIPTION OF THE DRAWINGS

FIG. 2 is a cut away of the oil transfer boot, installed over a filter with piercing elements having breached through the filter side and bottom walls of a continuous filter housing.

FIG. 2A represents a different style and design of piercing element(s) and depicts a tearing effect on the filter walls.

FIG. 2B shows yet another tack design, installed and held within a molded button hole type opening in the interior wall of the containment boot.

DESCRIPTION OF PREFERRED EMBODIMENT(S)

Before addressing the method and apparatus of the invention, it is believed helpful to briefly present, as background, certain physical and operational aspects of the industry standard spin-on filter and its sealed, working relationship to an engine block.

Figures 1, 1A, 1B:
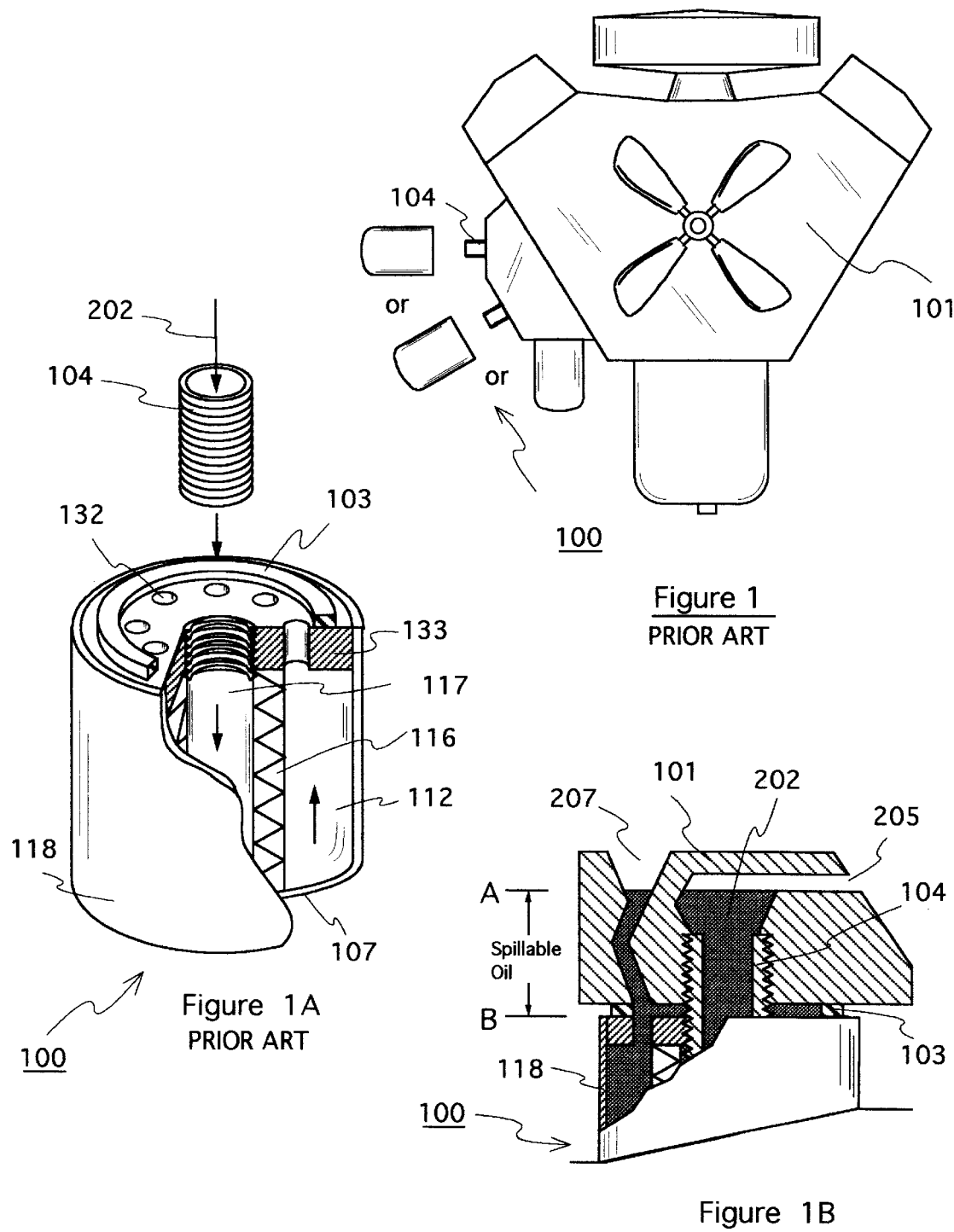
FIG. 1 is a diagrammatic presentation of an engine block showing several alternative mounting arrangements for typical filters.
FIG. 1A shows a spin-on filter separate and engine standpipe in perspective, separate and apart from the engine block of FIG. 1.
FIG. 1B shows a side cut away illustration of an installed filter and its mounting section of an engine block together with oil passageways, cavity and a piercing boot.

Background information pertinent to the invention is presented diagrammatically in FIGS. 1, 1A, and 1B.

Several different mounting configurations typical of spin-on filters are depicted, in FIG. 1, which configurations include horizontal, vertical and angular fitting to the engine block. Filters 100 regardless of orientation, threadably spin-on to a hollow male stud 104. Male stud, oil conduit combination 104 is permanently attached to engine block 101.

Structurally, and functionally, filter 100 is comprised of a porous filter media 116, seated and housed within sheet metal canister 118. Filter 100 is manufactured with a thicker, centrally threaded mounting plate insert 133, may be mated to hollow male stud 104. Sheet metal canister 118 is typically a one piece, formed stamping, having contiguous side and bottom wall thicknesses on the order of 50 thousandths of an inch.

Engine oil 202, shown diagrammatically with arrows in FIG. 1A, enters filter 100 under pressure via hollow conduit stud 104. Oil 202, within inner void 117, is forced by pressure through filtering media 116 into void 112 and after being filtered, flows back to the engine through multiple low pressure return holes 132. Oil pressure is retained throughout the filtering cycle by flat faced synthetic gasket 103, being held firmly between filter top 133 and engine block 101.

To the casual observer, it may appear that the vertically orientated spin-on filter would not present a spill problem if carefully removed. In contradiction, the vertical orientation, often presents the artisan with the largest volume of hidden spillable oil, as will now be shown and explained by FIG. 1B.

In FIG. 1B, a partial cut away of a lower section of engine block 101 is shown with filter 100 threadably mounted to a hollow conduit stud 104. Paths 205 and 207 are cast and/or machined into engine block 101 as appropriate for oil flow to and from spin-on filter 100. Oil 202 is presented as darken fill in the drawing.

With the engine at rest, adjoining cavities created for flow paths 205 and 207, along with hollow standpipe 104, capture a quantity of oil A–B above the elevation of filter gasket 103. This captured, at rest oil, defined previously as spillable oil is held above filter 100, and between elevations A and B every time an engine comes to rest, and can not gravity drain below elevation A.

This hidden, spillable oil is the crux of the spill problem with filter changes. Spillable oil A–B is thus always poised for a hidden spill during any spin-off operation. By virtue of its top entry and exit flow-through design, a spin-on filter does not drain when an engine is at rest. Likewise, these captured, hidden, elevated cavities do not drain of oil, regardless of the filter orientation. It is this higher elevation hidden volume in the engine cavity which is always the surprise contributor to excessive spills during filter changes. This root problem forms the basis for some significant features of my invention, which, for the first time, solves this long standing and previously unsolved difficulty.

Spillable oil varies from engine to engine and with filter mounting orientations, but averages about 10% to 20% of the volume of the filter, more than enough to create an oily mess for the technician and surrounding engine surfaces and appendages. With the true spill problem so defined, I discovered that oil filter removal could be accomplished without spills provided that the elevated spillable oil 202 is transferred from within the filter prior to breaking the seal maintained by gasket 103.

Additionally, I discovered that the canister side and bottom walls 118 are sufficiently thin and soft, so as to be deliberately puncturable with minimal force, thereby providing a fool proof methodology for contained transfer of previously uncatchable oil. Such localized puncturing coupled with simultaneous containment, is accomplished with my transfer boot invention.

Turning now to FIG. 2, transfer/containment boot 200 is shown positioned and in use on filter 100. Structurally, boot 200 may be constructed of a flexible, semi-rigid, plastic like material with embedded inwardly facing piercing elements 303. Other suitable embodiments, of course, are described later herein.

Containment boot 200, typically of a one piece construction, may be translucent and selectively non-homogeneous in wall thickness and localized rigidity, as operational aspects dictate. Upper walls are cup-like, and vertically rigid, yet laterally flexible, perhaps somewhat similar in structure to industry plastic two liter soda bottles of today.

Lower sides and bottom 201 of boot 200 are embedded with multiple piercing elements 303. Piercing element receiving buttons 216 are strategically molded into lower periphery 201. Further, this localized additional rigidity at selected button points helps maintain orthogonality between piercing elements 303 and canister walls 118.

Operationally, transfer/containment boot 200 is installed by hand over cylindrical filter 100. Tacks 303 within the inner periphery are configured such that an innermost piercing point diameter is slightly larger than the outer diameter of filter 100, thereby easily clearing filter housing during hand installation.

Thus, final positioning may be accomplished by sight or touch. Boot 200 is thus installed over filter 100 and moved upward as dictated by orientation, to a point where lower bottom piercing elements touch the bottom of filter housing 118, thereby positioning side and bottom tacks to pierce sidewalls 118 as required. With boot 200 so positioned, tacks 303 may then be forced through canister walls 118.

Given the sharpness of piercing elements 303, and the relatively soft, tin like canister walls 118, puncture force is little more than hand or thumb pressure. The puncturing force may be applied in any number of ways, such as a light tap to outer button surface 216 with a hand wrench. Alternatively, a slight leveraged pry inward using a screwdriver or wrench wedged against any close engine appendage, such as brace 114, will accomplish this task.

Further, an industry standard cam type filter strap wrench will easily supply the required forces to several elements at once when placed over lower periphery 201 of boot Z00 and squeezed inward. Such squeezing pressure will easily cause the desired deliberate puncturing of the filter housing. With the puncturing operation complete, internal oil 202, depicted by curved arrows, transfers through tears 119 into boot 200 (more clearly shown in FIG. 2A) as a result of the punctures by tacks 303.

Internal transfer as described, quickly reduces spillable oil A–B to zero, as further shown by filter oil level C and transferred oil level D. Note that oil levels C and D need not fully equalize in order to have a spill proof operation. One need only transfer the oil A–D and then the danger of a spill has been eliminated. It should be noted, however, that the wrench by compressive force has been used to do the filter removal. My piercing elements serve only to do the puncturing and in some instances, described hereinafter, hold the boot and the spillable oil in an unattended condition. Accordingly, elements 303 are not leverage items for filter removal but are primarily for spill proof filter removal with self capturing of spillable oil.

An experienced artisan quickly becomes educated to the amount of spillable oil A–B for a given engine and filter application, and can easily estimate appropriate transfer amounts of spillable oil visually through translucent walls 201. The amount of time for such containment is short and thus the artisan has time to devote to other tasks while the invention does its novel work.

Upon determination that all spillable oil has been transferred from within, the artisan may then break filter-to-engine seal 103, and freely spin off a combined filter 100 and boot assembly 200 by hand. Such a combined spin off is done without danger of leakage or spill. All spillable oil from within the engine cavity is thus contained within boot 200. As a result of my invention, no oil has been spilled over the engine block and the filter has been safely removed by my drip proof method and apparatus.

By the way, the best procedure—though not mandatory—is for the artisan to first wrench loosen the filter to a hand tight condition, and then turn to the inventive boot procedure. "Hand tight" status (really hand "loosened") is commonly done and does not increase the risk of oil spillage because filter gasket 103 allows such an approach. Gasket 103 is selected by the manufacturer with a size and thickness causing it to be compressed during routine filter installation by several thousandths of an inch. Such compression is the equivalent of at least a full revolution of the filter. Indeed, filter suppliers recommend tightening with a filter wrench ¼ to ½ turn past "hand" tight during installation.

Thus, the optimum procedure for usage of the transfer containment boot suggests that one loosen the filter to the point of hand tight with an ordinary filter wrench as a precursor to boot 200 installation. Gasket seal 103 will remain sealed in this hand tight status. Such a pre-boot step greatly facilitates final spin-off, making the combined filter and boot removal an easy hand operation.

Turning now to FIG. 2A, a variation of piercing element 303 is shown in a perspective view. Tack 303 may be favorably constructed with diametrically increasing cylindrical ramps 306. Such steps 306 assist in opening tear 119 in canister 118. Further, such graduated ramps above sharpened point 304, may incrementally open tear 119 with minimal additional inward force beyond the initial puncture. Such graduated steps also tend to catch inwardly against tear edges, thereby holding tack 303 within canister 118. This holding action, is particularly helpful in vertical and angular orientations, and provides additional boot 200 support against the weight of oil draining into boot 200.

Additionally, with the holding action of tacks 303, an artisan may slip the boot over housing 118, perform the puncture operation, and, go about related oil change tasks while spillable oil is transferring safely into boot Z00. Especially helpful—though not mandatory—is the translucent visible information available to the artisan. Associated markings, of course, could be placed on the outer surface of the boot so that the mechanic knows he can finally and safely remove the filter entirely.

Turning now to FIG. 2B, a second tack embodiment 303 is shown. Piercing point 304, may be constructed in multiples within a single tack 303, as shown, and positionally splayed outward in tulip fashion. Such multiple points, and flared configuration, provide orthogonal stability when piercing forces are applied. Head 307 of tack 303 is constructed of such breadth and flatness as to maintain perpendicularity with boot 200.

Also shown in FIG. 2B, button section 216 may be molded as a blind hole or tack head receiving cavity 225. Tack cavity 225 of boot 200 is internally cup shaped to receive and retain head 307 of tack 303. Such pop-in configuration, FIG. 2B, provides advantageous assembly and manufacturing options over my completely embedded discovery. (See tack 303, FIG. 2). With this embodiment, the tacks can be shipped loose and inserted, where and when, as needed. My novel approach thus provides greater flexibility in shipping and field use for my invention.

Figure 3:
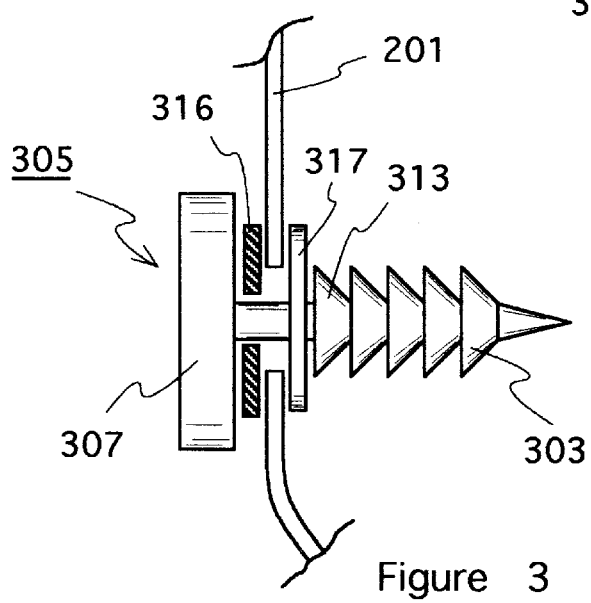
FIG. 3 is a partially expanded cutaway view of a piercing element assembly sealably installable through a containment boot wall.

Turning now to FIG. 3, an alternative assembly method is shown. Various assembly methods are used with my invention. In FIG. 3, assembly 305 is shown sealably installed through a boot wall. (Elements 307, 316, 317, 201, and 313 are drawn with exaggerated spacing for clarity of explanation.) In this FIG. 3 embodiment, piercing element (s) 303 may thus be installed through wall 201 and secured in place. Such an approach would most likely come from the supplier ready to use. This embodiment does not have the flexibility described above for my embedded or "button holes" embodiment of FIG. 2B.

In FIG. 3, compressible gaskets 316 and 317 form inner and outer oil tight tack seals against wall 201. Innermost step or ramp 313 of tack 303 may be configured with such spacing relative to head 307, as to pop through washer 317 under an assembly force. Such a component assembly method will firmly compress gaskets 316 and 317, sealing tack 303 relative to boot 200 and wall 201. This component assembly provides design options of replacement parts as well as the potential of more cost effective manufacturing.

Figure 4:
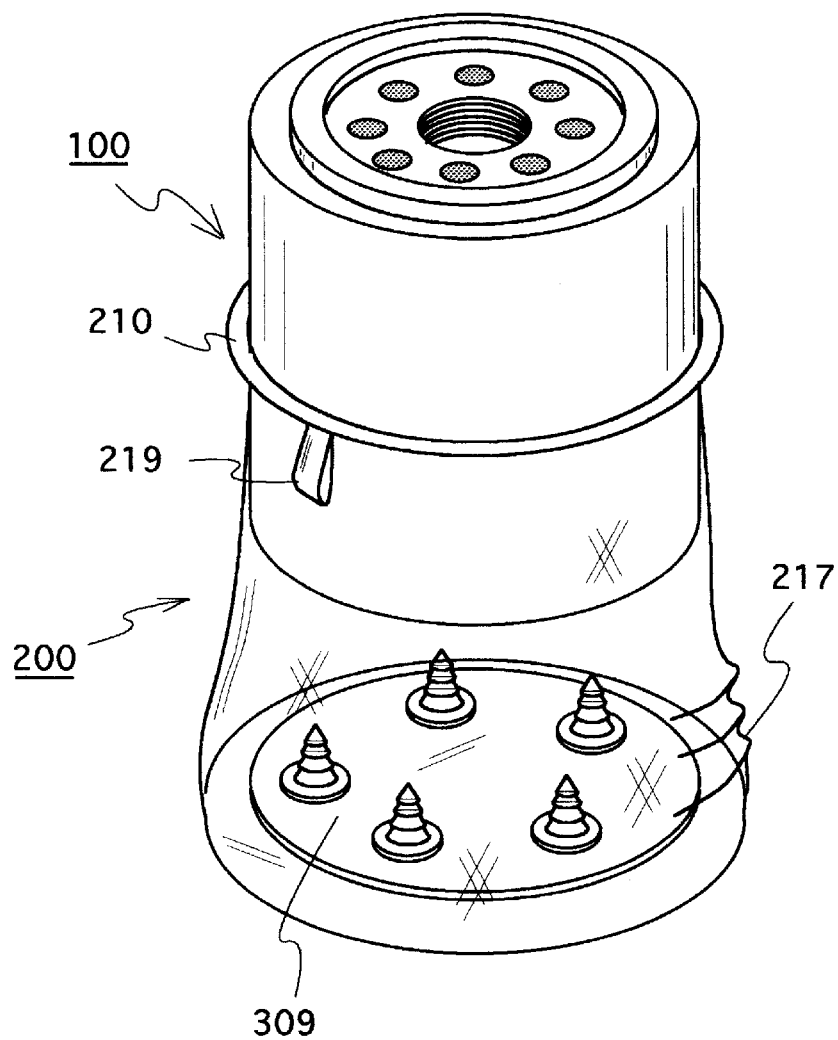
FIG. 4 is a perspective view of a translucent, boot provided with an installation strap aid, and a removable piercing insert assembly.

While I have achieved superior results with boot 200 being loosely fitted over a mounted filter as shown in FIG. 2, I also have disclosed herein a second embodiment, FIG. 4, which incorporates a snugly fitted O-ring type. Please note that I employ a snug fit primarily for holding assistance during a spill proof operation with my inventive features. This is not comparable to the attempt engine block seal of the prior art as earlier described.

An additional and highly advantageous feature of my FIG. 4 embodiment finds use in angular and tight quarter applications. O-ring 210 may be molded or otherwise fashioned as part of the top of boot 200. With the additional holding assistance from top O-ring seal 210, tacks 303 may be affixed to a single plate insert 309 for bottom piercing only.

I have discovered that many applications require only that the bottom wall alone of canister 118 need be punctured in order to achieve the necessary spill proof oil transfer. Accordingly, a separate and easily installable tack plate insert 309 may be dropped as needed in the boot 200. Such a plate may have one or more tacks of various shapes herein described suitably affixed or fastenable to plate disk 309. This separate insert plate 309 affords the field options similar to button hole methods previously described in connection with my FIG. 2B.

Please note that insert 309 may be loosely inserted just prior to application and then may be kept in the shop while the boot is cleaned or disposed of. Like plastic gloves of today, my boot may be disposable or sufficiently rigid to withstand cleaning for repeated uses. A button hole or separate plate approach makes such an approach commercially viable.

Extremely flexible lower sides 217 further aid in close quarter applications. With tighter fitting O-ring 210 embodiments, I have found that boot straps 219 may provide an additional aid during initial installation. Such straps may, of course, be applied to the boots of the other embodiments as well.

Figures 5, 5A:
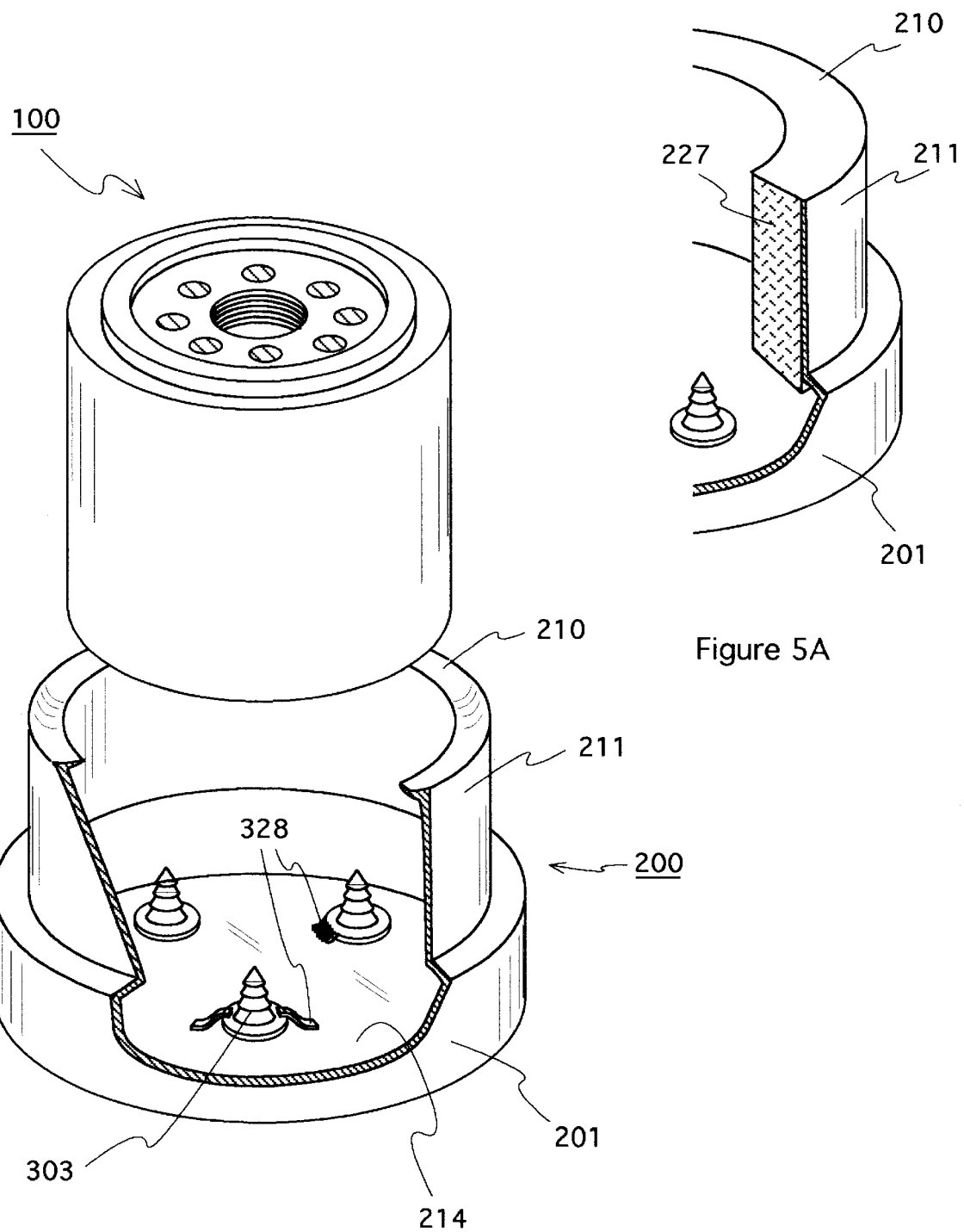
FIG. 5 is a rigid boot showing wiper seals and fixed bottom piercing elements.
FIG. 5A is a combination semi-rigid, absorptive sidewall and rigid bottom wall.

Turning now to FIG. 5, certain applications may use yet another embodiment of my invention. For filter applications both vertical and angular, where boot installation room is sufficient, a shorter, more rigid boot 200 may be installable. Such boot 200 is equipped with rigid sides 211, and bottom only fixed tacks 303. Again these tacks may be suitably affixed to the plate 214 by welding, molding or the like.

Rigid sides 211 are configured with a snug fitting wiper lip 210. Such wiper lip 210 are readily available and are commonly known in industrial seals. It may be of any suitable material such that it provides a lower amount of forward, and yet a higher amount of reverse resistance. This configuration thus helps hold boot 200 in place, even in the presence of the weight associated with the spill proof transfer of oil, mostly during unattended use as described earlier. Further, wiper lip 210 catches and prevents incidental leakage during handling, after filter and boot assembly are removed.

Lower wall 201, also of rigid material, is of the minimum height and diameter, sufficient to contain the previously described spillable oil. Procedurally, the entire boot is encouraged upward during the piercing process, with lip seal 210 sliding further onto filter 100 as tacks 303 pierce canister 118. The embodiment of FIG. 5 thus affords greater user latitude for application of puncture forces. Such forces may thus be applied anywhere against lower corner of wall 201 or outside surface of rigid bottom 214.

Turning now to FIG. 5A, sidewall 211 may be constructed of a semi-rigid thicker absorptive foam rubber material 227 and bonded to rigid lower wall 201. Such 211, 227 sidewall provides absorption as required, and frictional holding, during transfer operations. More importantly, the stretch or give and lateral flexibility allow boot 200 to be installed from more angles of attack, in tight quarters.

Figure 6:
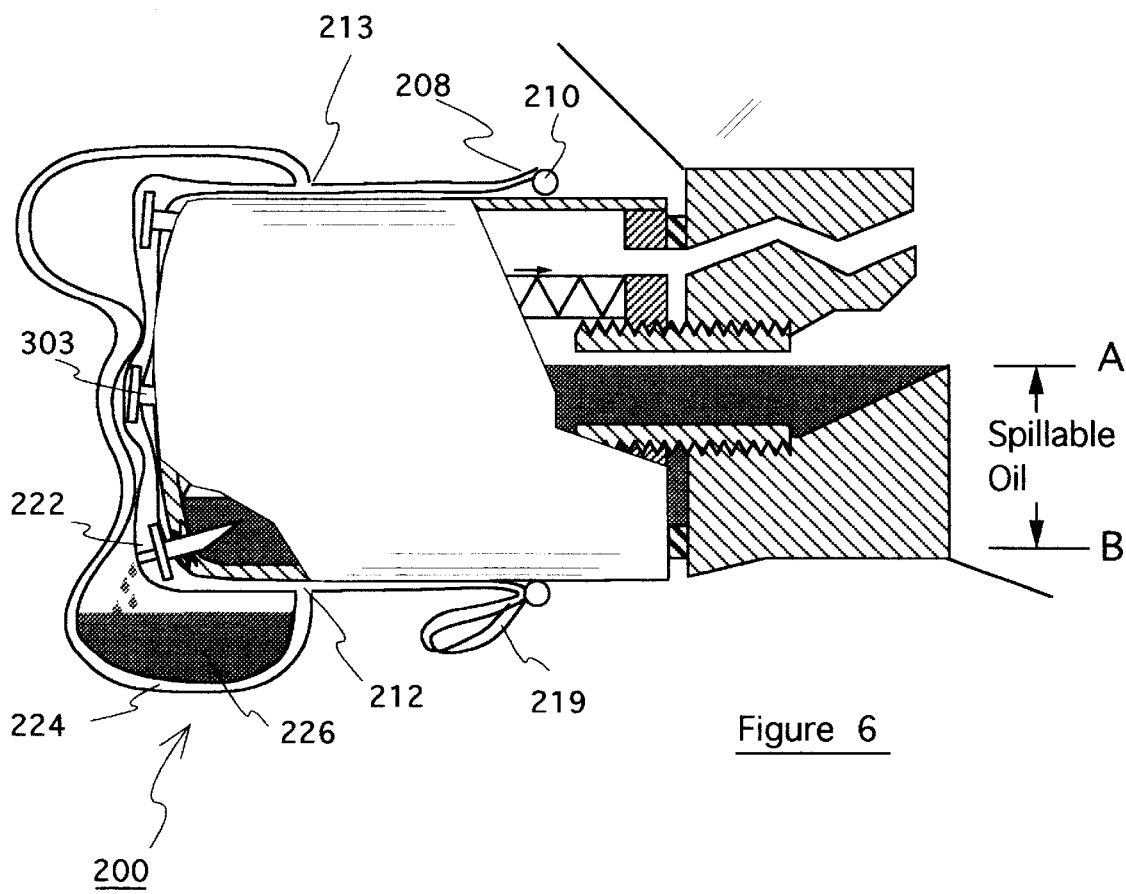
FIG. 6 is a cut away of a double wall filter boot embodiment as applied to a horizontal filter application.
Figure 6A:
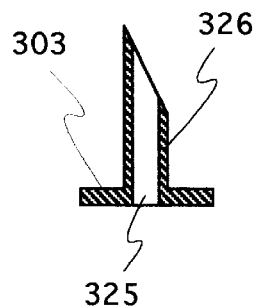
FIG. 6A is a detail of a hollow piercing element used in a double wall application.

Turning now to FIG. 6, a double bottom embodiment of boot 200 is shown positioned over a horizontally oriented filter. The same techniques of puncture and transfer from within apply to this embodiment.

Boot assembly 200 may be configured with an inner bottom 222 and an outer bottom 224. Bottom walls 222 and 224 are further sealed to each other at points 212 and 213. Piercing elements 303 are affixed to inner bottom 222.

Unlike single wall boots previously described, a double bottom embodiment incorporates elements 303 which are hollow as shown in cross section 6A. Hollow conduit 325 passes spillable oil completely through tack 303. Further, tacks for double bottom boots may have smooth sides 326, which create less tear.

Returning to FIG. 6, inner bottom 222 may be constructed of a heavier, more rigid material, than outer bottom 224, thereby providing structural rigidity for elements 303. Outer bottom 224 may be molded somewhat in the shape of a chef's hat and may be constructed of a lighter, very flexible material. As such, bottom 224 will sag from the weight of spillable oil, forming bulbous oil filled pockets 226 generally lower than the lower wall of filter 100.

Further, such bulbous pockets 226 will flex and deform as necessary during spin-off, as physical constraints of near obstructions dictate. Further, such flexible pockets 226 favorably funnel spillable oil rearward and downward during transfer.

Although perhaps more complex of construction, double bottom embodiments may prove applicable in limited space horizontal mounting applications, and particularly in marine applications where even a teaspoon of oil spilled and later pumped overboard can be the subject of a $10,000 fine. What has been presented, whether for engines of automobiles, trucks, or marine vehicles, however, is a spill proof method for an age old problem that up to this invention had remained unsolved.

The invention simply summarized is a device which is hand attachable with one or more internal piercing elements which create liquid release from within a filter housing thereby transferring the spillable oil through a punctured filter wall to a spill proof temporary boot or container. This puncture and safe oil transfer occurs prior to a final breaking of the seal between the engine and the filter.

While my invention has been described with reference to a particular example of a preferred embodiment, it is my intention to cover all modifications and equivalents within the scope of the following claims. It is therefore requested that the following claims, which define my invention, be given a liberal interpretation which is within the spirit and scope of my contribution to this art.

What is claimed is:

1. Apparatus for a spill free filter change for self containment of essentially all spillable oil trapped within engine block circulation cavities above a filter mounting area, said filter when mounted having an outer housing wall and a filter face which is normally sealed directly to a standard engine block, said apparatus comprises:

a hand installable containment boot adapted to slip over said engine-mounted filter while said filter is still sealed directly to said engine, which boot has a closed-end with internal capacity sufficient in volume to capture and self contain the trapped spillable oil;

one or more internal piercing, tearing and holding elements, which elements are orthogonally stabilized within said containment boot for purposes of receiving externally applied forces in order to tear drainage hole(s) in said filter wall and thus allow said trapped oil from within said engine to transfer through said torn filter wall into the closed end of said boot; and supporting means formed by said elements for self-supporting said boot during a hands off unattended spill free filter change.

2. The apparatus recited in claim 1 wherein the filter is of the spin-on type, said containment boot is essentially cup shaped and said apparatus further comprises:
   an open end for said containment boot of sufficient diameter to loosely receive the spin-on oil filter and said boot and having a length for containing therein most of the height of said mounted filter;
   an upper lip of said boot open end having a smaller diameter suitable for a snug circumferential fit on the filter housing; and
   a flexible bulbous bottom in said containment boot sized sufficiently for receiving and containerizing the spillable oil which drains through said drainage holes in said filter housing.

3. The apparatus recited in claim 1 wherein said elements further comprise:
   tack points of sufficient sharpness so as to readily penetrate the filter housing; and
   a circular disk insert means holding said points at the bottom of said cup shaped boot.

4. The apparatus recited in claim 1 wherein the elements are further characterized by comprising:
   a piercing length sufficient to penetrate through the filter housing;
   means for transferring oil outwardly through said holes pierced in said lower section of said filter housing;
   a piercing and multi-facetted tearing means sufficient to rupture the filter housing for said oil drainage; and
   said multi-facetted means, serving as said supporting means to hold said containment boot in place upwardly and/or laterally during an unattended transfer and self-containment of spillable oil into said boot.

5. The apparatus recited in claim 4 wherein the oil transferring means comprise:
   longitudinal openings running from the point of the element(s) toward the walls of the containment boot.

6. The apparatus recited in claim 1 wherein the containment boot is further characterized by comprising:
   a flexible bulbous bottom for additional volumetric containment of oil in tight engine spots.

7. The apparatus recited in claim 1 wherein the containment boot is further characterized by comprising:
   a translucent material for providing a visual estimate of the amount of drained oil that has been captured and self-contained within said boot.

8. A method for containing spillable oil from within a mounted engine oil filter and an engine filter block mounting area, said method comprising the steps of:
   slipping over such filter a flexible containment boot having a lower section adapted for receiving pry or impact forces at the outer section thereof;
   orthogonally stabilizing inwardly-directed rupture elements within said containment boot for purposes of receiving externally applied forces;
   rupturing holes, by force applied at the element area, in the filter housing while said filter is still sealed to said engine;
   allowing oil from within said engine to transfer through the ruptured filter wall and into said containment boot;
   containing the transferred oil in the containment boot and yet allowing the user to remove both the containment boot and the ruptured filter from the engine during a spill free filter change.

9. The method for containing spillable oil of claim 8 and further comprising the additional step of:
   reducing the internal volume of spillable engine and filter oil through said pierced holes prior to breaking the seal between the filter and the engine such that no oil spills from the engine or filter.

10. The method for containing spillable oil of claim 8 and further comprising the additional step of:
    capturing the oil flowing from said pierced holes in the containment boot prior to breaking the seal between the filter and the engine block.

11. The method for containing spillable oil of claim 8 and further comprising the additional step of:
    forming longitudinal holes through the piercing elements to improve oil drainage therethrough into said containment boot.

12. The method for containing spillable oil of claim 8 and further comprising the additional step of:
    forming said containment boot with double walls that capture the spillable oil in a pocket, and
    incorporating hollow piercing elements which transfer oil between said double walls.

13. The method for containing spillable oil of claim 12 and further comprising the additional step of:
    inserting absorbent material in the oil capturing pockets.

14. The method for containing spillable oil of claim 8 and further comprising the additional step of:
    forming said containment boot from readily disposable material.

15. A spill free filter change method for containing essentially all spillable oil from an industry standard engine by spill free removal of oil from within the engine cavities immediately adjacent to a standard filter mounting whereby said filter seals directly to said engine, said filter change method comprising the steps of:
    fashioning a narrow profile containment boot having an open upper end, a closed lower end, and non-obtrusive force receiving area(s) at inwardly directed filter puncturing elements;
    applying inwardly directing forces at said force areas in order to catchably install said boot to said filter by said puncturing elements; and thereby
    self-supporting said boot by said puncturing elements in order to facilitate hands off oil drainage before removal of said filter from said engine for a spill free filter change.

16. The method of claim 15 comprising the additional steps of:
    rupturing, while said filter is still sealed to said engine, one or more holes in the filter by force applied to said elements at said areas.

17. The method of claim 15 comprising the additional steps of:
    fashioning said elements in the form of tack points of sufficient sharpness so as to readily penetrate the filter housing; and
    arranging said elements on a circular disk insert means removably located in the bottom of said containment boot.

18. The method of claim 15 comprising the additional steps of:
    positioning said open end of said boot over the loosened but still sealed filter with said elements located in proximity to the base of the filter; and
    loosening the filter until it is hand tight without breaking a direct engine-to-filter seal prior to said puncturing and hands off steps.

19. The method of claim 15 comprising the additional steps of:

peripherally sealing the open end of said boot to an upper portion of the filter wall;

self supporting the containment boot by the elements;

allowing oil from within said engine cavities and the filter to transfer through the ruptured filter into said containment boot;

capturing the drained oil within the containment boot; and completing the hand removal of the filter from the engine with the sealed boot attached to the removed filter.

20. The method for containing spillable oil of claim 15 and further comprising the additional step of:

applying a penetrating force to said piercing elements, and causing said piercing elements to puncture through the sidewalls of the filter housing prior to breaking the seal between the oil filter and the engine mounting surface.

21. The method for containing spillable oil of claim 20 and further comprising the additional step of:

removing spillable oil from an engine through holes punctured in the filter housing prior to breaking the gasket-to-filter engine block seal.

* * * * *